Nov. 3, 1964        R. A. COURI        3,155,748

METHOD OF MAKING OPTICAL COMPONENTS

Filed Aug. 3, 1960

INVENTOR
RICHARD A. COURI
BY Louis K. Gagnon
Noble S. Williams
ATTORNEYS

United States Patent Office 3,155,748
Patented Nov. 3, 1964

3,155,748
METHOD OF MAKING OPTICAL COMPONENTS
Richard A. Couri, South Woodstock, Conn., assignor to American Optical Company, Southbridge, Mass., a voluntary association of Massachusetts
Filed Aug. 3, 1960, Ser. No. 47,172
1 Claim. (Cl. 264—1)

This invention relates to a method of manufacture of optical components formed of glass and primarily intended for use in the infra-red region of the electromagnetic spectrum, and more particularly relates to a method of manufacture of aspherically curved optical components of glass for such purposes in an accurate, efficient and inexpensive manner.

In many instances, depending upon the specific uses for which individual optical components are intended, glass is preferred over other light-transmitting materials as the material for forming the components. However, when such optical components are to transmit light rays of any selected wave length or wave lengths within an extended range of infra-red radiation, it becomes necessary to employ a special kind of glass since most commonly available glasses for optical purposes are partially or nearly completely opaque to infra-red radiation, particularly in parts of the spectral range above one or two microns. On the other hand, arsenic trisulphide glass, a unique and unusual glass, which has but limited light transmission in the visible region of the spectrum is quite transparent to all wave lengths of infra-red radiation from the visible region up to as much as nine or ten microns in the infra-red and also is only slightly less transparent to wave lengths up to twelve microns or more.

While blanks of arsenic trisulphide glass may be ground and polished in more or less conventional fashion when plane, cylindrical or spherical refracting optical surfaces are desired thereon, the forming of aspherically curved refracting optical surfaces of proper predetermined curvature and of good optical finish and accuracy on such blanks by grinding and polishing thereof is a difficult, expensive and time-consuming matter. And, on the other hand, while the forming of such aspheric optical surfaces on blanks of this infra-red transmitting arsenic trisulphide type of glass by known molding techniques might at first appear as a desirable alternative method, nevertheless, such has not been possible because of the unique and unusual characteristics of the arsenic trisulphide glass.

For instance, an aspherically curved ground and polished mold of a metal such as stainless steel, which can be so polished as to be substantially free from all microscopic grain and surface texture, cannot be satisfactorily used as a matrix material for forming the arsenic trisulphide glass components even though it might be quite satisfactory with other glasses. This is because arsenic trisulphide glass at its molding temperature will chemically react with the metal and pit the highly polished surface of the mold cavity. Also, the molded surfaces of the glass components formed in these metal molds will be impaired.

Likewise, even though arsenic trisulphide glass melts at an appreciably lower temperature than most commercially available glasses and also even though the surfaces of the mold cavity in such a mold of ordinary glass may be ground and polished so as to be completely free of grain or surface imperfections, nevertheless, difficulty has been experienced when molds of various of these well-known types of glass were tried. The arsenic trisulphide components being formed therein would not separate readily and without injury from the polished surfaces of the mold cavity. Also even when molded components were obtained therefrom, the formed surfaces thereof were pitted and cloudy due to chemical attack and to the formation of gas bubbles between the mold surface and the component.

It has been found, however, that by following the method of the present invention, aspherically curved optical components intended for use in the infra-red region of the spectrum and formed of arsenic trisulphide glass may be efficiently, accurately and economically made.

It is, accordingly, an object of the present invention to provide an improved method by which aspherically curved optical components of arsenic trisulphide glass may be formed in an efficient, accurate and economical manner.

Other objects and advantages of the invention will become apparent from the detailed description when taken in conjunction with the accompanying drawings wherein.

As stated previously, arsenic trisulphide glass is highly desirable for use in forming optical components intended for use in the infra-red regions of the electromagnetic spectrum. It is convenient also that this glass may be ground and polished, in conventional fashion, without difficulty to provide spherically curved components and the like. While such components are often used in optical systems, it is well known that better optical performance may at times be obtained from optical components which have their light-refracting surfaces aspherically curved rather than merely spherically curved. However, the time and effort that has been required heretofore for accurately forming aspherically curved arsenic trisulphide glass components by known grinding and polishing techniques has proved to be most impractical. Also since neither ground and polished metal molds nor molds of an ordinary glass will serve satisfactorily for forming an aspherically curved arsenic trisulphide component because of chemical attack, etc., other possibilities have been investigated in an endeavor to find a way to efficiently and accurately form such aspheric arsenic trisulphide components in an accurate and economical manner.

As a result, it has now been found that while most known glasses and metals will not work satisfactorily as a mold or matrix for use in the forming of arsenic trisulphide optical components (even though such materials would be highly desirable from the standpoint of being able to provide highly polished mold surfaces free from microscopic grain or surface texture) nevertheless, it is possible by practice of the method of the present invention to form by a molding technique and associated steps aspherically curved arsenic trisulphide glass components of excellent quality in an efficient and inexpensive manner, and this has been possible in part because of the use of a high silica borosilicate type glass as the material from which the molds or matrices have been made.

One condition which is believed to be partly responsible for the good results which have been obtained by the use of such a high silica borosilicate type of glass for forming the matrix or mold for casting this special infra-red transmitting glass is that while most commercially available glasses provide alkali conditions and react with the arsenic trisulphide glass while the latter is in a heated and softened condition therein, the high silica borosilicate glasses do not. Furthermore, arsenic trisulphide glass does not wet or stick to the borosilicate mold when the heating and molding operations are properly controlled. Also, high silica borosilicate types of glass have relatively high melting points and also very low coefficients of expansion in comparison to most other commercially available glasses and in comparison to arsenic trisulphide glass. In fact, the coefficient of expansion of high silica borosilicate glass is only about one-eighth that of the arsenic trisulphide glass.

Figure 1:
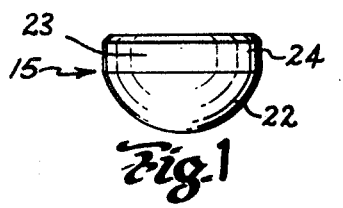
FIG. 1 is a side elevational view of a blank or preform of arsenic trisulphide glass and intended for use in carrying out the method of the present invention.
Figure 2:
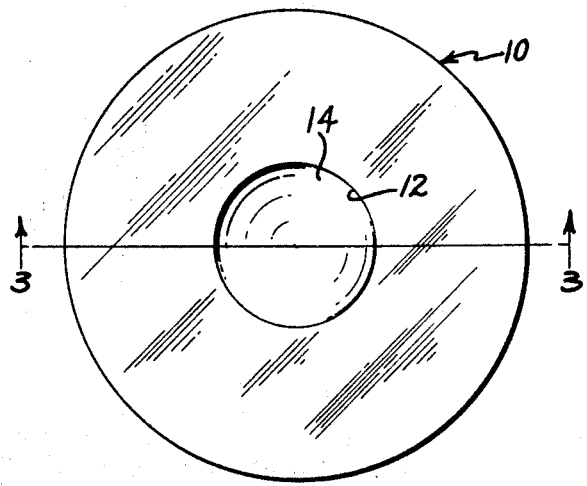
FIG. 2 is a plan view of a specially formed glass mold intended for use in the method of the present invention.

The results are, accordingly, that when a suitable blank, as indicated at 10 in FIG. 2, of such a relatively high silica borosilicate glass is provided with a ground and polished cavity or recess 12 of proper predetermined shape and is used with a properly prepared blank or "preform," such as indicated at 15 in FIG. 1, of arsenic trisulphide glass, a molded component of this glass having excellent surface qualities can be formed and then easily removed from the mold, and thus the mold which is a more expensive thing to make can be used again and again for forming such infra-red transmitting components.

The recess or cavity 12, in this instance, is provided with an aspherically curved lower surface portion 14 arranged in concentric relation to a vertical axis 18 and has a straight-sided cylindrically curved upper side wall portion 16 merging smoothly into this aspherically curved lower surface portion 14, and these surfaces are purposely accurately ground and polished to a high optical finish. Of course, any one of a very large number of different aspheric shapes and of various sizes may be provided the mold cavity depending upon the particular optical performance desired of the component to be cast therein. And, at times, it will be desirable in forming the aspheric curvature of the cavity to so control its curvature as to compensate for the amount of contraction which will normally occur when the arsenic trisulphide component cools after being cast.

Figure 3:
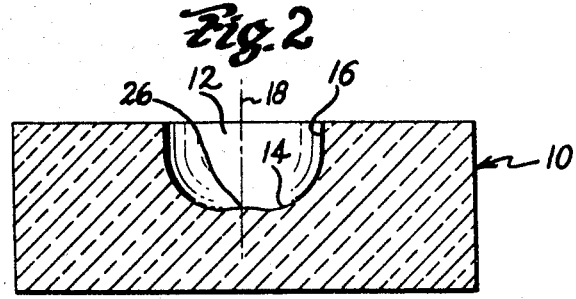
FIG. 3 is a sectional view taken substantially upon line 3—3 of FIG. 2 and looking in the direction of the arrows.
Figure 4:
FIG. 4 is an aspherically curved optical component formed of arsenic trisulphide glass and obtained by the practice of the method of the present invention.

In carrying out the improved method, it is essential to initially form upon that part of the blank or preform 15 of arsenic trisulphide glass which is to engage the aspheric surface of the mold a ground and polished surface, and this can best be done when same is of a regular geometric shape, such as the spherical surface 22, and this surface should approximate closely but loosely the aspheric curvature of the mold cavity. It is also desirable to have a second related part of the preform, such as the upper part 23 provided with a straight-sided cylindrical surface 24 which is of a slightly smaller transverse dimension than the straight-sided wall portion 16 of the mold cavity. The reason for this looseness is so that the preform 15 may be placed in the mold cavity 12 and have its polished surface 22 rest upon a lower part thereof, such as on the raised central part 26 shown in FIG. 3 during the slow heating and sagging thereof. Thus, the adjacent surfaces of the preform and of the cavity are so related that the preform may sag or slump into contact with the mold surfaces without entrapping air therebetween. However, after the formed component has cooled, it will not adhere to the surfaces of the cavity but may be readily removed therefrom. Such a formed aspheric component is shown at 28 in FIG. 4.

The weight of a finished aspherically curved optical component may be computed or otherwise determined, and thereafter the volume of each successive preform to be cast may be accurately determined by weighing the ground and polished preform. The thickness of the cylindrical upper section 24 above the polished spherical surface 22 serves the purpose of supplying "extra material" so that after said preform has slumped or sagged into the mold cavity, a component of proper shape and thickness will be obtained.

Arsenic trisulphide glass will soften and start to slump at approximately 590°–600° F. while high silica borosilicate glass softens at a very much higher temperature. Care should be exercised, however, to correctly control the temperature of the mold and the preform so that temperatures above 600° are not produced since same would be injurious to the arsenic trisulphide glass, tending to cause same to break down and form gas pockets therein or between the preform and the mold. Also, it is advisable to protect the preform during heating and slumping by placing an inverted saucer-like cover or the like on the mold 10 and overlying the preform so as to exclude dust and cooling drafts therefrom.

As soon as the preform has slumped into contact with the aspheric and other surfaces of the mold, the mold 10 can be chilled by a blast of air for a few moments, or, that is, until its temperature has been rapidly reduced to approximately 400° F. Or, in other words, the temperature of the preform should be rigidly reduced after sagging to slightly below the upper part of the annealing range for arsenic trisulphide glass; the annealing range for arsenic trisulphide glass being between approximately 430° F. and 300° F.

The rate at which the formed arsenic trisulphide component in its mold should be lowered through the annealing range will depend somewhat upon the size of the component. In the instant disclosure wherein an aspheric component which is approximately 30 millimeters in diameter and 17 millimeters in thickness has been represented, an acceptable annealing period would be two hours and fifteen minutes, and the component may be brought down through this annealing range at the rate of one degree per minute. Other annealing periods ranging from two hours to twenty-four hours may be desirable for components of other sizes. At all times, however, it is well to keep in mind that experience has indicated that prolonged slumping temperatures after the slumping of the preform has been achieved has a tendency to pit the aspheric surface of the component, and thus should be avoided as much as possible.

Having described my invention, I claim:

The method of making an infra-red transmitting refracting lens component formed of arsenic trisulphide glass and having an accurately formed aspherically curved finished lens surface thereon, said method comprising forming in a piece of relatively high silica borosilicate glass a mold cavity of a predetermined size and shape and having a high optical finish thereon, said cavity shape including a cylindrically curved upper portion and an aspherically curved lower portion arranged in concentric smoothly merging relation to each other, the aspherical curvature of the lower cavity portion being of a shape similar to the aspheric curvature desired in a finished lens surface of said lens component except larger by an amount sufficient to substantially fully compensate for the contraction which will be experienced by the arsenic trisulphide glass as it cools and pulls away from adjacent surface portions of said cavity after heating and sagging steps have been performed thereon, forming by grinding and polishing a piece of arsenic trisulphide glass into a preform having a cylindrically curved upper part and a spherically curved lower part in concentric relation therewith, said cylindrical part being generally similar to but slightly smaller in diameter than the diameter of the cylindrically curved upper portion of said mold cavity, and said spherically curved lower part of said preform being of such a size as to closely approximate the aspheric curvature of said mold cavity, and having a high optical polish thereon, positioning said preform in said mold cavity with only its spherically curved lower surface resting upon a centrally located point on said aspherically curved cavity surface, heating said mold and preform to a temperature and for a period of time just sufficient to cause said preform to soften and sag into intimate contacting relation with adjacent wall portions of said cavity in such a manner as to replace all air from the space between said preform and said cavity, cooling said mold and sagged preform rapidly to a temperature near the upper part of the normal annealing range of arsenic trisulphide glass, maintaining said mold and sagged preform within said annealing range for a period of time ranging between two and twenty-four hours, and thereafter slowly reducing the temperature of said mold and sagged preform to room temperature, whereby contraction of said sagged preform will free same from wall portions of said cavity and provide an arsenic trisulphide lens component having an accurately formed aspherically curved refracting lens surface thereon.

References Cited in the file of this patent

UNITED STATES PATENTS

| | | |
|---|---|---|
| 1,048,227 | Straubel | Dec. 24, 1912 |
| 2,429,692 | Joyce | Oct. 28, 1947 |
| 2,482,698 | Tillyer | Sept. 20, 1949 |
| 2,804,378 | Upton | Aug. 27, 1957 |

OTHER REFERENCES

"New Optical Glasses with Good Transparency in the Infrared," Journal of the Optical Society of America, volume 43, No. 12, December 1953, pages 1153 to 1157, (Copy in 88–57LM).